Jan. 22, 1963
W. J. MacLELLAN
3,074,515
STEERING STABILIZER
Filed Sept. 14, 1960
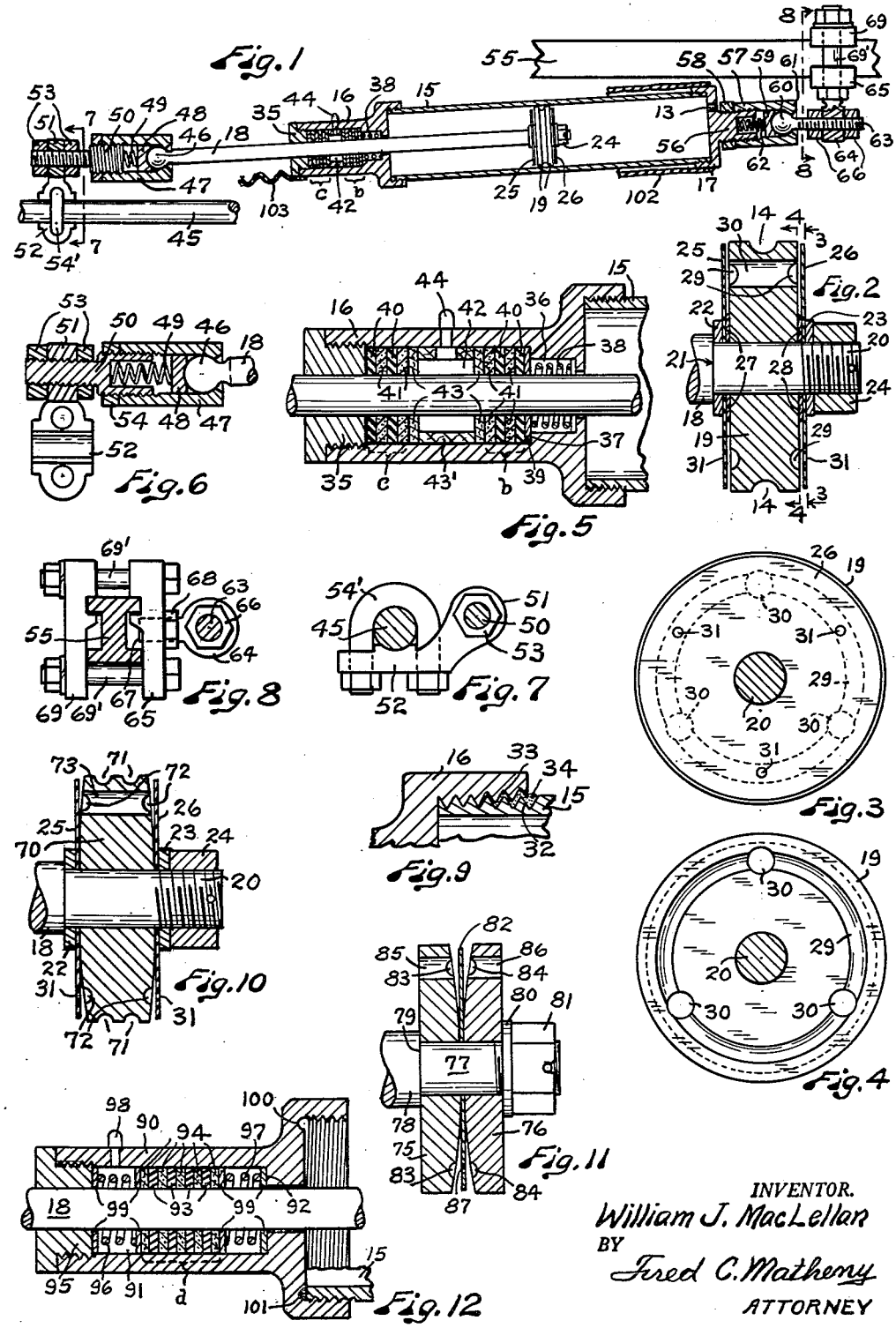
INVENTOR.
William J. MacLellan
BY
Fred C. Matheny
ATTORNEY

United States Patent Office 3,074,515
Patented Jan. 22, 1963

3,074,515
STEERING STABILIZER
William Joseph MacLellan, Los Angeles, Calif., assignor of one-third to Anthony J. Ronga and of one-third to Dan C. Waddell, both of Los Angeles, Calif.
Filed Sept. 14, 1960, Ser. No. 55,985
5 Claims. (Cl. 188—96)

This invention relates to a steering stabilizer for use in connection with the steering apparatus of motor vehicles to automatically absorb and counteract road shocks to which the front wheels of the vehicle are subjected.

An object of this invention is to provide a steering stabilizer of simple and efficient construction which is readily installed between the steering mechanism and a fixed part of a motor vehicle and which is operable to prevent sudden sidewise deflection of the front vehicle wheels, to check and arrest any abnormal tendency of the wheels to deviate from a normal course, and to make the vehicle on which it is installed easier to control.

Another object is to provide a steering stabilizer which will help to hold a motor vehicle on a straight and steady course in the event of sudden tire deflation thus minimizing the danger of serious accident due to tire blow-out and enabling the driver to bring the vehicle to a safe, sure, straight stop regardless of the speed at which the vehicle is traveling.

Another object is to provide a steering stabilizer which is readily applicable to pleasure cars, trucks, busses and all types of motor vehicles now in common use and which can be provided as standard equipment on new vehicles.

Another object is to provide a steering stazilizer which will tend to hold a vehicle on a straight course, will reduce the danger of shimmy and wobble in the front vehicle wheels, will relieve the driver of strain by checking and absorbing road shocks, will increase the useful life of steering mechanism and particularly the life of power steering units due to the reduction of shock and road vibration on wheels, axles, tie rods and steering devices, and to provide a stabilizer which will improve the road traction, and stopping and cornering qualities of the vehicle on which it is installed.

Another object is to provide a steering stabilizer which is not adversely affected by temperature changes which tend to vary the viscosity of fluid used therein.

Another object is to provide a steering stabilizer which is efficiently sealed against all fluid leakage that might impair its efficiency thereby making it more dependable in use and reducing to a minimum the need for replenishing the fluid supply in the cylinder of the stabilizer.

Another object is to provide a steering stabilizer having a highly efficient, sensitive and durable valve piston structure movable in a cylinder and capable of resisting quick or sudden movements but allowing complete freedom of normal steering, said valve piston having liquid flow passageway means extending from one side to the other thereof and having at least one thin flat resilient disc secured to the hub portion thereof and normally spaced from the faces of the valve piston, said disc being adapted to be flexed by sudden pressure of liquid against the same to move the disc against a face of the piston and greatly retard the flow of liquid therethrough.

Other objects will be apparent from the following description taken in connection with the accompanying drawings.

In the drawings FIGURE 1 is a view partly in plan and partly in section showing a steering stabilizer constructed in accordance with this invention as it may appear when applied to the front axle and tie rod of a motor vehicle.

FIG. 2 is a detached sectional view, on a larger scale than FIG. 1, showing a valve piston and a fragment of a piston rod.

FIG. 3 is a view taken substantially on line 3—3 of FIG. 2 showing the piston rod in section and showing one of the resilient valve discs in elevation.

FIG. 4 is a view taken substantially on broken line 4—4 of FIG. 2, showing the piston rod in section and showing one face of a valve piston in elevation.

FIG. 5 is a detached fragmentary view in longitudinal section, with parts in elevation, and on a larger scale than FIG. 1, showing the piston rod bearing and packing means disclosed in FIG. 1.

FIG. 6 is a detached sectional view, with parts in plan, showing coupling and clamp means used to connect an end portion of a piston rod with a motor vehicle tie rod.

FIG. 7 is a sectional view on broken line 7—7 of FIG. 1, with parts in elevation, showing parts of the tie rod connecting means.

FIG. 8 is a sectional view, with parts in elevation, taken substantially on broken line 8—8 of FIG. 1 and on a larger scale than FIG. 1.

FIG. 9 is an enlarged fragmentary detail sectional view illustrating the manner of threading and soldering a cap onto the end of a cylinder to insure against oil leakage.

FIG. 10 is a sectional view, with parts in elevation, showing a modified form of valve piston which may be used in place of the valve piston shown in FIGS. 1 to 4.

FIG. 11 is a sectional view, with parts in elevation, showing another modified form of valve piston.

FIG. 12 is a sectional view similar to FIG. 5 showing piston rod bearing and packing means of modified form.

Like reference numerals refer to like parts throughout the several views.

This steering stabilizer comprises a cylinder 15 having two end caps 16 and 17 threaded onto and preferably sealed to the respective ends thereof in a manner shown in FIG. 9 and hereinafter explained. The cap 16 is adapted to cooperate in slidably receiving and guiding a piston rod 18. A valve piston 19 is reciprocably disposed within the cylinder 15 and is secured to the piston rod 18. The valve piston 19 is of a suitable size to fit snugly but with an easy working fit in the cylinder 15 so that said piston 19 will move easily but there will not be much leakage between the periphery of the piston member 19 and the cylinder walls. Preferably an oil seal groove 14 is provided in the circumferential wall of the piston member 19. The cylinder 15 is filled with liquid, which may be oil, and preferably an oil which is fairly free flowing and which will withstand ordinary temperature changes without much change in its viscosity is used.

Preferably the piston carrying end 20 of the piston rod 18 is of reduced diameter to provide a shoulder 21 against which a collar 22 may rest. Preferably another collar or washer 23 and a nut 24 are used in securing the piston member 19 on the reduced end portion 20 of the piston rod 18.

Two plane flat discs 25 and 26 of thin, highly resilient metal, such as Phosphor-bronze of a thickness in the order of one sixty-fourth of an inch, are positioned at opposite sides of the piston member 19. The discs 25 and 26 are spaced a short distance from the respective sides of the piston 19 by thin washers 27 and 28 which fit over the end portion 20 of the piston rod 18 and are interposed between the discs 25 and 26 and the piston member 19. The discs and piston member and thin washers 27 and 28 are securely clamped by tightening the nut 24. The outer sides of the discs 25 and 26 outwardly from the collars 22 and 23 each present a fairly large disc area which reacts against the oil if a quick movement is imparted to the piston member 19 and this tends to bend or flex the disc so that at least its marginal portion is pressed against the piston member 19.

Each side of the piston member 19 is provided with an annular groove 29 a short distance inwardly from the periphery of the piston. The piston member 19 is further provided with one or more transverse holes or perforations 30 of fairly large size which extend through it from the groove 29 on one side to the corresponding groove on the opposite side. Three of the holes 30 are shown in FIGS. 3 and 4 and the number of these holes 30 may be varied as required. These holes 30 are large enough to permit a free flow of liquid through the piston member 19 without retarding such normal movement of the piston as occurs during ordinary steering operation of the vehicle.

Each resilient disc 25 and 26 is provided with one or more small holes 31 positioned in registration with the annular grooves 29 in the piston member 19. The provision of the annular grooves 29 in piston member 19 obviates the necessity of adjusting and holding the resilient discs 25 and 26 so the small holes 31 are in registration with the larger holes 30 in the piston member 19. The diameter of each resilient disc 25 and 26 is slightly less than the diameter of the piston member 19 and cylinder 15 so that a fairly free flow of liquid is permitted between the periphery of each disc 25 and 26 and the internal wall of the cylinder 15. During normal steering movement the piston member 19 will be moved slow enough in the cylinder 15 so that the displaced liquid can flow past the peripheries of the resilient discs 25 and 26 and through the holes 30 without offering substantial resistance to movement of said piston member. If a force is exerted tending to quickly and abruptly deflect the front vehicle wheels from the course they are following such force will have a tendency to quickly and abruptly move the piston member 19 relative to the cylinder 15 and the quickly applied pressure of one of the resilient discs 25 or 26 against the liquid will flex or bend at least the peripheral portion of that discs into contact with the adjacent side of the piston member 19 and will substantially close off the openings 30 in said piston member. This will leave only the small holes 31 in the resilient disc for the liquid to flow through slowly and the quick or abrupt side deflection of the wheels will be arrested before the resiliency of the disc again moves it clear of the piston member.

The discs 25 and 26 are sufficiently resilient so that they will straighten or flatten out as soon as they are relieved of substantial pressure thus opening a path of substantial area around their peripheries for oil to flow to the openings 30 in the piston member 19.

It is highly desirable to have this stabilizer operate at maximum efficiency at all times and it is further desirable to have it operate for long periods of time without requiring servicing and replacement of the liquid in the cylinder 15. It thus becomes highly desirable to efficiently seal the caps 16 and 17 at both ends of the cylinder 15. These caps are threaded onto the cylinder 15 and they are permanently sealed against leakage in the manner illustrated in FIG. 9 by providing, in each instance, a straight external thread 32 on the end portion of the cylinder 15 and a tapered internal thread 33 within the portion of the cap which threads over the cylinder. When this is done the threads in the bottom of the cap, namely at the left in FIG. 9, interfit tightly with the outermost threads on the end of the cylinder and some space is left between the threads near the right end of the cap and the threads on the cylinder. After the cap has been tightened on the cylinder this space between the threads is filled with melted solder 34. Thus the caps are both tightly threaded and permanently soldered onto the ends of the cylinder and leakage between the caps and the cylinder is effectively prevented.

The cap 16, FIGS. 1 and 5, through which the piston rod 18 operates must be sealed against leakage. This is attained by making said cap 16 relatively long and providing therein a large bore to receive adequate packing means. A combined plug and bearing member 35 is threaded into the outer end of the cap 16. A spring chamber 36 of reduced diameter is provided in the bottom of said cap 16 and a shoulder 37 is formed at the forward end of the spring chamber 36. A compression spring 38 is disposed in the spring chamber 36. A metal washer 39 rests against the shoulder 37 and receives the thrust of the spring 38. A sealing assembly $b$ comprising a plurality of alternately positioned rubber washers 40 and cork washers 41 is provided next outwardly from the metal washer 39. Another sealing assembly $c$ is positioned adjacent the end plug and bearing member 35 and is also formed of a plurality of alternate rubber washers 40 and cork washers 41. A grease chamber 42 is provided between the two sealing assemblies $b$ and $c$. Two fiber washers 43 spaced apart by a fiber sleeve 43' cooperate in forming the grease chamber 42. A grease fitting 44, through which heavy grease for lubrication purposes can be introduced, communicates with grease chamber 42. All rubber washers 40 are made of highly grease resistant material, such as "neoprene." The two sealing assemblies $b$ and $c$, spaced apart by the grease chamber assembly insure against leakage from the cylinder 15.

The means for attaching the piston rod 18 to a tie rod 45 is shown in FIGS. 1, 6 and 7. This means includes an integral ball 46 on the end of the piston rod 18 fitted within a sleeve 47 for limited universal movement. A movable thrust member 48 is provided on the sleeve 47 for the ball 46 to press against. A compression spring 49 holds the thrust member 48 against the ball 46. A coupling member 50 has one end portion threaded onto the sleeve 47. The other end portion of the coupling member 50 extends through an eye member 51 of a clamp bracket 52 and is secured to said eye member 51 by nuts 53. Preferably a jam nut 54 is provided on the coupling member 50 for engagement with the end of the sleeve 47. The clamping bracket 52 is shaped to fit the tie rod 45 and is fixedly secured to said tie rod 45 by a U-shaped bolt 54'.

The front vehicle wheels are supported at the ends of the front axle 55 in well known manner and the tie rod 45 is connected with means by which these front wheels can be steered by longitudinal movement of the tie rod. Obviously road shocks and quick acting forces which tend to angularly deflect the front vehicle wheels from their course will be communicated to the tie rod 45 and will be resisted and absorbed by the steering stabilizer means.

The cap 17 at the end of the cylinder 15 shown at the right in FIG. 1 is subjected to considerable strain because it connects the cylinder 15 with a part of the vehicle, such as the front axle 55. Said cap 17, see FIGS. 1, 7 and 8, is provided with a shank 56 which is threaded into a tubular fitting 57 and is locked to the fitting 57 by a lock nut 58. A filler opening, which is tightly closed by a plug 13, is provided in the cap 17 to facilitate introduction of oil. Preferably the plug 17 is positioned so that it is normally concealed by the lock nut 58 but can be reached by unscrewing the sleeve 57 and said lock nut 58. The part of the fitting 57 outwardly from the shank 56 has a thrust member 59 and a ball 60 disposed therein and the end portion 61 of the fitting 57 is of reduced diameter so as to retain the ball 60 therein and thereby provide a ball and socket type universal joint. Preferably a compression spring 62 is provided between the shank 56 and thrust member 59 to take up lost motion in the joint formed in part by the ball 60.

A threaded stem 63 is rigid with the ball 60 and extends through an eye member 64 which is secured to a clamp plate 65, see FIG. 8. Nuts 66 secure the stem 63 to said eye member 64. The eye member 64 has a shank 67, FIG. 8, which is threaded into the clamp plate 65 and is held rigid with said clamp plate 65 by a lock nut 68. The angular position of the eye member 64 can be adjusted by loosening the nut 68. This adjustment is usually made at the time the steering stabilizer is installed on a motor vehicle and it is a desirable adjustment to provide for. A second clamp plate 69 and bolts 69' cooperate with the clamp plate 65 to provide a fixed connection with the motor vehicle axle 55.

FIG. 10 shows a valve piston assembly of modified form. In said FIG. 10 the piston rod 18 having the end portion 20 of reduced diameter, together with collars 22 and 23, nut 24, and discs 25 and 26 having small perforations 31 therein, are similar to those shown in FIGS. 1 to 4 and hereinbefore described. A piston member 70 of modified form is mounted on the part 20 of piston rod 18. The sides of the piston member 70 are convex. These sides are shown curved and generally spherical in FIG. 10 but they can be flat and without curvature in radial directions and substantially conical. The piston member 70 has circumferential oil grooves for oil sealing purposes. Said piston 70 also has a circular oil flow groove 72 on each side thereof near its periphery. Said piston member 70 is also provided with several transverse oil flow passageways or ports 73 of fairly large size which intersect the circular oil flow grooves 72 and provide for a flow of oil through said piston member. The thin flexible valve discs 25 and 26 are clamped against the opposite hub portions of the piston member 70 by the collars 22 and 23 when the nut 24 is tightened. The small oil flow passageways 31 in each disc 25 and 26 register with the circular oil flow grooves 72 in the sides of the piston member 70. The operation of the valve piston shown in FIG. 10 is similar to the operation of the valve piston shown in FIGS. 1 to 4 except that the bending of the thin resilient discs 25 and 26 around the curved convex surfaces of the piston member 70 will not be localized to as great an extent in any particular part of said discs but will be distributed over the major portions of said discs and said discs will be less liable to crack or break at a location where flexing occurs.

A valve piston structure of modified form which functions similarly to the valve piston structures shown in FIGS. 1 to 4 and 10 is shown in FIG. 11. This piston structure comprises two piston members 75 and 76 mounted on a smaller end portion 77 of a piston rod 78 between a shoulder 79 on said piston rod 78 and a collar 80 and nut 81. A thin flat resilient metal disc 82 of slightly smaller diameter than the piston members 75 and 76 is clamped between said piston members. The opposed faces of the piston members 75 and 76 are convex so that an expanding space, outwardly considered, is provided between said convex faces within which the resilient metal disc 82 is disposed. The convex inner faces of the piston members 75 and 76 are respectively provided with circular grooves 83 and 84 positioned a short distance inwardly from their peripheries. Said piston members 75 and 76 are further each provided with one or more fairly large transverse ports 85 and 86 which communicate with the circular grooves 83 and 84 and extend through the piston.

The resilient metal disc 82 is provided with at least one small liquid flow opening 87 positioned to register with the circular face grooves 83 and 84 in both of the piston members 75 and 76. Preferably three or more of the ports 85 and 86 of fairly large size are provided in spaced relation in each piston member 75 and 76 so that the build up of liquid pressure against a side of the resilient disc 82 in response to a quick piston movement will not be materially retarded. In normal steering operation the liquid flow will be through the ports 85 and 86 and around the periphery of the resilient disc 82. If force is applied which tends to produce a quick movement of the piston members 75 and 76 in their cylinder the disc 82 will be forced against one of said piston members and liquid flow will be restricted to an amount which can pass through the restricted openings 87 in the disc 82 and between the cylinder walls and the peripheries of the piston members 75 and 76. These piston members 75 and 76 have a fairly close working fit in their cylinder so that only a limited amount of liquid can pass their peripheries.

The bending strain on the disc 82 is greater than it is on each disc if two discs are used, as in FIGS. 2 and 10, because the disc 82 must bend in both directions from its normal position. The tendency of this disc 82 to crystallize and break at a location where it flexes is minimized by making the convex inner surfaces of the two piston members 75 and 76 curved and of generally spherical shape so as to distribute the bending over a large area of the disc 82 and thus minimize the amount of bending at any particular location in said disc.

FIG. 12 shows a tubular fitting 90 of modified form which may be used instead of the fitting 16 shown in FIGS. 1 and 5 on the end of the cylinder 15 through which the piston rod 18 extends. The fitting 90 has a tubular bore 91, of substantially larger diameter than the piston rod 16, provided with a bottom shoulder 92. A single sealing assembly d of alternate rubber washers 93 and cork washers 94 is provided within the bore 91 of fitting 90 in spaced relation from the shoulder 92 and in spaced relation from a bearing plug 95 which is threaded into the outer end of the fitting 90. One compression spring 96 is interposed between the bearing plug 95 and one side of the sealing assembly d and another compression spring 97 is interposed between the shoulder 92 and the other side of said sealing assembly d. The springs 96 and 97 maintain pressure from both sides on the washers of the sealing assembly d at all times. A grease fitting 98, through which heavy grease may be introduced, communicates with the part of the bore 91 within which the spring 96 is disposed. Preferably but not essentially metal washers 99 are provided for both ends of the springs 96 and 97 to press against.

In FIG. 12 I show an annular groove 100 in the bottom of the cupped end of the tubular fitting 90, this being the end which threads over the cylinder 15. The annular groove 100 is adapted to receive a rubber sealing ring 101 against which the end of the cylinder 15 is adapted to seal. The groove 100 and sealing ring 101 may be used in combination with the soldered joint shown in FIG. 9 or said sealing ring 100, 101 and soldered joint may each be used independently of the other.

Obviously any desired number of the rubber and cork washers in alternately positioned relation in either the sealing assembly d, shown in FIG. 12, or the sealing assemblies b and c, shown in FIG. 5, may be used.

Because this steering stabilizer must operate in a location where it is in the path of flying stones and other road material thrown off by the wheels the cylinder 15 is preferably protected by enclosing it in a fairly heavy rubber tube 102, a fragment of which is shown in FIG. 1. Also the piston rod may be protected by enclosing it in a collapsible, bellows type rubber tube 103.

The foregoing description and accompanying drawings clearly disclose preferred embodiments of my invention but it will be understood that changes may be made within the scope of the following claims.

I claim:

1. A steering stabilizer comprising a cylinder having liquid therein; a piston rod extending into said cylinder; a piston member secured to said piston rod and fitting snugly and reciprocably in said cylinder, said piston member having two circular grooves in the opposed sides thereof adjacent its periphery and having at least one liquid flow passageway of substantial area therein extending through the piston member between said circular grooves and providing for a free flow of liquid from one side to the other of said piston member; and two thin flat resilient discs secured to the hub portions of opposite sides of said piston member coaxially thereof, each of said discs having at least one small opening extending therethrough in registration with a circular groove in said piston member, each of said discs being of slightly less diameter than said cylinder to leave a liquid flow passageway between the peripheral portion of the disc and the wall of the cylinder, the outer portions of said discs normally standing clear of the sides of said piston member leaving the liquid flow passageways in said piston member open and the passageway around the periphery of said discs open and said discs being capable of being flexed by liquid pressure against the outer sides thereof and moved into engagement with the faces of said piston member to substantially close the liquid flow passageways through the piston member.

2. The apparatus as claimed in claim 1 in which said piston member has at least one oil seal groove extending entirely around its peripheral portion.

3. A steering stabilizer comprising a cylinder having liquid therein; a piston rod extending into said cylinder; a piston member secured to said piston rod and fitting snugly and reciprocably in said cylinder, said piston member having near its periphery a plurality of liquid flow openings of substantial area providing for a free flow of liquid from one side to the other of said piston member and said piston member having substantially the entire area of each of its two opposite faces convexly and spherically rounded; and two thin flat resilient discs secured to the hub portion of the convex sides of said piston member, each of said discs having a plurality of small and restricted passageways therein positioned to communicate with the larger liquid flow openings in said piston member and each of said discs being of slightly less diameter than said cylinder to leave a liquid passageway between the peripheral portions of the disc and the inside cylinder wall, said discs assuming substantially flat radial positions when they are substantially free from unbalanced liquid pressure, whereby the rounded convex faces of the piston member recede from the discs to thereby leave the liquid flow openings in the piston member and around the peripheries of said discs unobstructed for the free flow of liquid through the liquid flow openings and said resilient discs being adapted to be flexed by unbalanced liquid pressure away from their normal positions and into engagement with the convex faces of the piston member to substantially close the liquid flow openings through the piston member in response to quick relative movement of the piston member and cylinder, the flexing in said discs being distributed throughout a major portion of the area of said discs by the rounded convex faces.

4. The apparatus as claimed in claim 3 in which each convex spherically rounded face of the piston is provided adjacent the periphery of said piston with a continuous circular groove in which the liquid flow openings that extend through the piston terminate, and in which the restricted passageways in each resilient disc register with the circular grooves in the adjacent side of the piston.

5. A steering stabilizer comprising a cylinder having liquid therein; a piston rod extending into said cylinder; two piston members secured to said piston rod adjacent to each other and fitting snugly and reciprocably in said cylinder, each of said piston members having liquid flow passageways extending therethrough at a substantial distance outwardly from the center thereof, said two piston members having spherically rounded convex opposed outwardly divergent faces provided with circular grooves intersected by the liquid flow passageways; and a thin flat resilient disc securely clamped between the hub portions of the adjoining convex spherically rounded faces of said two piston members, said resilient disc having therein liquid flow openings of restricted size positioned in registration with said circular grooves whereby they communicate with the liquid flow passageways in said piston members and said disc being of slightly smaller diameter than said cylinder leaving a liquid passageway between the peripheral portion of said disc and the inside wall of the cylinder, the outer portion of said disc normally standing clear of the convex faces of both of said piston members and said disc being yieldable to liquid pressure, whereby it can be flexed into engagement with the convex face of either of said piston members.

References Cited in the file of this patent

UNITED STATES PATENTS

| | | |
|---|---|---|
| 230,132 | Jerome | July 20, 1880 |
| 1,887,287 | Churchill | Nov. 8, 1932 |
| 2,196,436 | Briggs | Apr. 9, 1940 |
| 2,239,112 | Nichelsen | Apr. 22, 1941 |
| 2,252,771 | Katcher | Aug. 19, 1941 |
| 2,310,570 | Briggs | Feb. 9, 1943 |
| 2,673,103 | Trembolada | Mar. 23, 1954 |
| 2,811,226 | Allinquant | Oct. 29, 1957 |
| 3,003,597 | Carbon | Oct. 10, 1961 |

FOREIGN PATENTS

| | | |
|---|---|---|
| 206,357 | Australia | Aug. 25, 1955 |
| 13,997 | Great Britain | June 15, 1912 |
| 833,874 | Great Britain | May 4, 1960 |